(12) United States Patent
North

(10) Patent No.: US 9,015,027 B2
(45) Date of Patent: Apr. 21, 2015

(54) FAST EMULATION OF VIRTUALLY ADDRESSED CONTROL FLOW

(75) Inventor: Geraint North, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 13/440,147

(22) Filed: Apr. 5, 2012

(65) Prior Publication Data

US 2012/0271615 A1 Oct. 25, 2012

(30) Foreign Application Priority Data

Apr. 21, 2011 (EP) .................................... 11163402

(51) Int. Cl.
*G06F 9/455* (2006.01)
*G06F 9/30* (2006.01)
*G06F 12/10* (2006.01)

(52) U.S. Cl.
CPC .......... *G06F 9/45516* (2013.01); *G06F 9/4552* (2013.01); *G06F 9/30174* (2013.01); *G06F 12/1063* (2013.01); *G06F 2212/151* (2013.01); *G06F 2009/45583* (2013.01); *G06F 9/45508* (2013.01)

(58) Field of Classification Search
None
See application file for complete search history.

(56) References Cited

U.S. PATENT DOCUMENTS

| 6,615,300 | B1 | 9/2003 | Banning et al. | |
| 6,820,255 | B2 * | 11/2004 | Babaian et al. | 717/151 |
| 6,970,982 | B2 | 11/2005 | Altman et al. | |
| 6,978,233 | B1 | 12/2005 | Burns | |
| 7,805,710 | B2 * | 9/2010 | North | 717/151 |
| 7,822,941 | B2 | 10/2010 | Vick et al. | |
| 8,086,822 | B2 * | 12/2011 | Devine et al. | 711/206 |
| 8,127,121 | B2 * | 2/2012 | Yates et al. | 712/203 |
| 8,402,224 | B2 * | 3/2013 | Bruening et al. | 718/100 |
| 8,607,013 | B2 * | 12/2013 | Chen et al. | 711/206 |
| 8,615,749 | B2 * | 12/2013 | Barraclough et al. | 717/159 |
| 2005/0015758 | A1 * | 1/2005 | North | 717/138 |
| 2008/0140971 | A1 | 6/2008 | Dankel et al. | |
| 2008/0244538 | A1 | 10/2008 | Nair et al. | |
| 2009/0300263 | A1 * | 12/2009 | Devine et al. | 711/6 |
| 2009/0300612 | A1 * | 12/2009 | Devine et al. | 718/1 |
| 2009/0300645 | A1 * | 12/2009 | Devine et al. | 718/107 |

(Continued)

OTHER PUBLICATIONS

Drepper, Ulrich "Memory part 3: Virtual Memory" LWN.net (2007) available at <http://lwn.net/Articles/253361/>.*

(Continued)

*Primary Examiner* — Kamini S Shah
*Assistant Examiner* — Jay B Hann
(74) *Attorney, Agent, or Firm* — Roy W. Truelson

(57) ABSTRACT

Two or more processes for executing a source application are emulated using: a virtual trampoline memory in which each emulated process has a respective private trampoline memory; and a shared code heap memory. Each emulated process only sees the shared code heap and its respective private trampoline memory. A respective equivalent target instruction fragment for writing to the code heap is generated for each of multiple source instruction fragments from the application, each target instruction fragment being indexed by its physical address in the code heap. Each of at least one jump instruction in the fragment is replaced with a jump to a corresponding slot in the virtual trampoline memory. A trap is written to each corresponding private trampoline slot, each trap adapted to be replaced by a jump to an address in the code heap corresponding to the jump destination.

20 Claims, 16 Drawing Sheets

(56) References Cited

U.S. PATENT DOCUMENTS

2011/0153307 A1    6/2011   Winkel et al.
2013/0024674 A1*   1/2013   Lovett et al. ............... 712/227

OTHER PUBLICATIONS

Baiocchi, José A. & Childers, Bruce R. "Heterogeneous Code Cache: Using Scratchpad and Main Memory in Dynamic Binary Translators" Proceedings of the 46th Annual Design Automation Conf., DAC'09, pp. 744-749 (2009) available from <http://dl.acm.org/citation.cfm?id=1630103>.*

Payer, Mathias & Gross, Thomas "Generating Low-Overhead Dynamic Binary Translators" Proceedings of the 3rd Annual Haifa Experimental Sys. Conf., SYSTOR'10 (2010) available from <http://dl.acm.org/citation.cfm?id=1815724>.*

Jason D. Hiser et al., "Evaluating Indirect Branch Handling Mechanisms in Software Dynamic Translation Systems," International Symposium on Code Generation and Optimization, Mar. 11-14, 2007, pp. 61-73.

Mathias Payer et al., "Fast Binary Translation: Translation Efficiency and Runtime Efficiency," Department of Computer Science ETH Zurich, Jun. 20, 2009; obtained from http://amas-bt.cs.virginia.edu/2009proceedingt/4-payer-paper.pdf.

Fabrice Bellard, "QEMU, a Fast and Portable Dynamic Translator," USENIX Association, FREENIX Track: 2005 USENIX Annual Technical Conference, pp. 41-46.

Victor Moya Del Barrio, "Study of the techniques for emulation programming," Computer Science Engineering—FIB UPC, Jun. 18, 2001, 152 pages.

* cited by examiner

FAST EMULATION OF VIRTUALLY ADDRESSED CONTROL FLOW

BACKGROUND

1. Field of the Invention

This invention relates to a method and apparatus for fast emulation of virtually addressed control flow in multi-processor emulators. In particular this invention describes a way of efficiently emulating the virtual addressing characteristics of a range of processors in multi-processor configurations when the processors are being emulated by a dynamic binary translator.

2. Description of the Related Art

Virtual memory management is an operating system memory management technique in which the physical memory of a computer system is presented to several independently running processes as if each process had access to a large bank of memory for its exclusive use. An address translation process converts the memory addresses (virtual addresses) used by a running process to the actual location (physical addresses) of the data on the computer system. When the sum of the data in all virtual address spaces exceeds the available physical memory, the operating system will typically be responsible for storing the additional data to disk. Different processors implement address translation in various ways; using translation look aside buffers (TLBs), page tables and other techniques. Almost universally, a virtual address space containing the virtual address is mapped to a corresponding physical region or memory and a physical address. The smallest unit of mapping is referred to as a page, typically between 4 and 64K in size; and the logic that performs mapping is known as the memory management unit (MMU).

An operating system will segregate the various processes into separate virtual address spaces. The operating system provides a process with access only to the pages of memory that it has been granted access to, and disallows access to the private data of other processes. However, processes also share library code and global data so a given physical page can be mapped into multiple virtual address spaces simultaneously.

A given platform thread of execution on a platform processor (of which there may be several on a single platform processor) runs with one virtual address space at a time; mapping is used to convert the virtual addresses in the virtual address space to the physical memory addresses that actually contain the data. Therefore, a processor instruction may perform a "32-bit load from address 0x1000" where the virtual address is represented in hexadecimal as 0x1000, and will be transformed by the MMU into a physical address under control of the virtual address space's memory map. When executing a different process with the different virtual address space then the virtual address 0x1000 will be mapped to a different physical address entirely. Conversely, shared libraries (which are present only once in physical memory) may appear in different processes at different virtual addresses, since the virtual address range allocated to a shared library often depends on the order in which the process' shared libraries were loaded, which might be different for different processes.

When the platform processor threads switch from the execution of one process to a new process, a context switch operation will switch out the current virtual address space for a new virtual address space of the new process that is about to be executed.

SUMMARY OF INVENTION

One technique used in the emulation of platform processors is dynamic binary translation (DBT), in which machine instructions for one type of processor (the "subject") are executed on a different type of processor CPU (the "target") by translating blocks of instructions intended for execution on the subject processor into instructions executable on the target processor (these blocks of target instructions are referred to as fragments). Translation and the execution of these fragments are interleaved, with translations performed on-demand as new code is encountered and needs to be executed.

Translation of control flow in subject memory (jumps between blocks of code) is nontrivial because the destination of the jump is expressed in terms of the subject virtual address space, where the code at the destination is not directly executable on the target processor. Emulation must therefore provide a mechanism for mapping between a subject virtual address and target virtual addresses at which the equivalent fragment resides, so that control flow can occur between fragments in the correct fashion.

Therefore, two mappings are needed: mapping subject virtual addresses into subject physical addresses; and mapping subject physical addresses to the address of an executable fragment of instructions on the target processor.

Sometimes this mapping needs to be performed only once; for instance, when a subject destination physical address is stable and therefore the two target fragments can be permanently connected together with a direct jump instruction. For example, a simple branch that jumps over one instruction but remains on the same page can be permanently linked, as re-execution of the branch in the future, no matter what the subject virtual memory map contains at that point, will always cause the branch to reach the same destination.

In other cases, it is not possible to construct a permanent jump instruction, and instead address mapping must be performed every time the jump is taken. This is because the subject virtual memory map can change over time. For example, the fragment corresponding to a piece of subject code that jumps to absolute virtual address 0x1000 cannot be determined without knowing the subject virtual memory map that is loaded at the point in time where the branch was taken. These control flow transfers between fragments are referred to as arcs.

The simplest form of translation allows the emulation of a single process, referred to here as an "Application Emulator". A DBT uses subject virtual addresses to uniquely identify blocks of subject code, with each block of subject code being translated into a new fragment the first time it needs to be executed. Thus, the destination of a jump to subject virtual address $X_{SubjectVirtual}$ can be obtained by looking up $X_{SubjectVirtual}$ in a table of translations to find $X_{Target}$, the address of the corresponding target fragment. If a mapping is not found, the translation is performed and the resulting $X_{SubjectVirtual} \rightarrow X_{Target}$ maplet added to the map.

In a more complex DBT, referred to here as a "System Emulator," many processes are emulated, as well as the operating system kernel itself. The arc-destination problem described above becomes more complex because the implementer of the DBT typically does not want to produce duplicate fragments for the same piece of code in every different virtual address space present on the system; for example, it does not make sense to be translating a common function such as memcpy( ) for each process that uses it.

A DBT uses subject physical addresses to index its translations. This has the advantage of requiring only a single fragment for each unique piece of code (since it resides in physical memory in only one place) at the expense of a more complex mapping operation, since the DBT must now translate jump destinations, specified as subject virtual addresses into subject physical addresses before it can perform the lookup to find the appropriate fragment. Two mapping transforms are needed.

$$X_{SubjectVirtual} \rightarrow X_{SubjectPhysical} \rightarrow X_{Target}$$

These two mapping transforms must be performed not only for every jump to a variable address (for example, to an address loaded from memory), but also to every jump that crosses a page boundary (or indeed, wherever an instruction stream crosses from one page to the next). Just because two pages are contiguous in one virtual address space does not mean that the pages are necessarily contiguous in every address space, and so even these simple control flow operations become dependent on the current virtual address space and MMU configuration, and must be resolved dynamically. In the typical DBT, each emulated subject processor would be represented by a thread of execution within a single overall DBT process.

To summarize the problem, consider a simplified example. In dual processor environment, two different applications are launched concurrently. Two new processes are created and configured with new virtual address spaces, each containing a mapping of the dynamic linker method. Only one copy of the dynamic linker code is loaded into physical memory, and both virtual address spaces reference it. When run in a DBT environment as described above, there will be a single fragment produced for each of the blocks of subject dynamic linker code, and those fragments will be shared between the two emulated CPUs.

As the CPUs execute the dynamic linker, the two application binaries (one for each of the two processes) are loaded. Since the applications are different, one copy of each resides in physical memory, but both are mapped into address 0x1000 in their associated address space.

When the dynamic linker is ready to begin execution of the subject application, it executes a simple jump instruction to address 0x1000, which each process will resolve differently, since different applications have been loaded into that address in their different address spaces. The problem solved in this disclosure is how to perform control flow like that efficiently without having to perform a double mapping operation every time a jump is executed. Jump operations can occur as often as once in every six instructions for some computer architectures and double mapping would occur each time.

"Fast Binary Translation: Translation Efficiency and Runtime Efficiency", Gross et al., 2009, Department of Computer Science, ETH Zurich, describes an implementation of fastBT, a generator for low-overhead, table-based dynamic (just-in-time) binary translators. fastBT uses a trace cache and trampolines to obtain efficiency in translation and execution of the translated program. The key to fastBT's performance is a configurable optimizations for the different forms of indirect jumps. However, providing an optimization for multi processor systems or optimizing virtual-to-physical mapping is not addressed.

In a first aspect of the invention there is provided a method for emulating two or more processes for executing a source application, said method for executing on a multi-processor platform and comprising: providing virtual trampoline memory whereby each emulated process has a respective private trampoline memory; providing shared code heap memory, wherein each emulated process only sees the code heap and its respective private trampoline memory; fetching a fragment of source instructions from the application; generating equivalent target instructions for writing to the code heap, the fragment of target instruction being indexed by its physical address in the code heap; generating, for each jump instruction in the fragment, a jump to a slot in the virtual trampoline memory; and writing a trap in each private trampoline slot, each trap adapted to be replaced by a jump to a physical address in the code heap corresponding the start of the same or a different target instruction fragment.

The trampoline region is private to each emulating process; therefore the jump from the slot in the trampoline region to the physical address of the fragment in the code heap need be written only once during the execution of the instructions and while the address space of the emulating process remains the same.

Control flow takes place between fragments in the code heap by using simple jumps via the local trampoline region. The prior art would place an indirect jump from fragment A to a virtual memory location for a fragment B and this requires mapping during each execution for both the indirect part and for the virtual part. The present method places a jump requiring no mapping at the end of fragment A to a slot in a private trampoline region; the slot is for storing the direct jump to the start of fragment B in the code heap, calculated at the time of the first jump.

The effect of this invention is to remove the need to perform a double mapping operation each time an emulated jump is executed. Instead, changes to an emulator's virtual address space (which occur many orders of magnitude less often than the execution of jump instructions) cause appropriate modifications to the corresponding local trampoline region, such that control flow is directed appropriately. Modern CPUs are able to accurately predict branches, such that the addition of a second jump instruction produces no significant performance degradation compared with jumping directly from one fragment to another.

Advantageously further comprising an emulating process reaching the trap and performing the following steps:
  locating the emulated virtual address for the attempted jump;
  looking up the corresponding emulated physical address;
  looking up the corresponding code cache physical address; and
  replacing the trap with a jump instruction to the code cache physical address. More advantageously further comprising making the jump to the code cache physical address.

Advantageously further comprising generating, if the jump instruction in the fragment is a relative jump in the same memory page, a corresponding target relative jump within the same memory page and not a jump to a trampoline slot. This is another way of saying only writing the virtual jump if the physical address of the destination of the jump instruction is changeable. A changeable physical address is one that cannot be statically determined A relative branch jump within the same page is static in that it would be the same for all processes whatever physical page is being used. All indirect jumps and all absolute jumps cannot be statically determined because the actual physical destination will be different for different memory spaces.

Advantageously wherein the emulated virtual address for the attempted jump is written in each trap.

Advantageously wherein when an emulated process changes its address space then affected slots in affected local trampoline regions are reset back to traps. Further advantageously further comprising: locating virtual addresses in the old address space of the changed emulating process; locating corresponding slots in the trampoline region; and resetting the located slots in the trampoline region to traps by rewriting the trap jump.

Such a feature provides for the maintenance of the local trampoline region to be performed in response to the removal of page mappings from the MMU. New mappings to be performed on-demand the first time a jump instruction is executed after a change to the page mapping has "invalidated" the branch buffer entry. Fragments are made inaccessible when they are "invalidated" by a modification to the original subject code on which they are based.

Advantageously further providing that each subsequent target instruction fragment in a chain of target instructions is determined by the memory space of a respective emulating process.

Advantageously further wherein each trampoline slot being indexed on the origin address of the jump. The trampoline slot is an offset into a trampoline region and the same offset for each trampoline region.

The invention described below can be implemented entirely in software if the hardware architecture provides sufficient features. Some computer architectures may require modifications to the CPU hardware in order to implement this invention, and even for cases where an implementation is possible without hardware enhancement, changes made to the hardware could be used to improve performance.

The description provided is for the POWER processor, but the techniques are generally applicable to any CPU, although (as described above) it is possible that some hardware enhancements may be required or would be helpful.

In a second aspect of the invention there is provided a system as described in claim 11.

In a third aspect of the invention there is provided a computer program product as described in claim 21.

In a fourth aspect of the invention there is provided a computer program as described in claim 13.

DESCRIPTION OF DRAWINGS

Embodiments of the invention will now be described, by means of example only, with reference to the accompanying drawings in which.

DETAILED DESCRIPTION OF THE EMBODIMENTS

Figure 1:
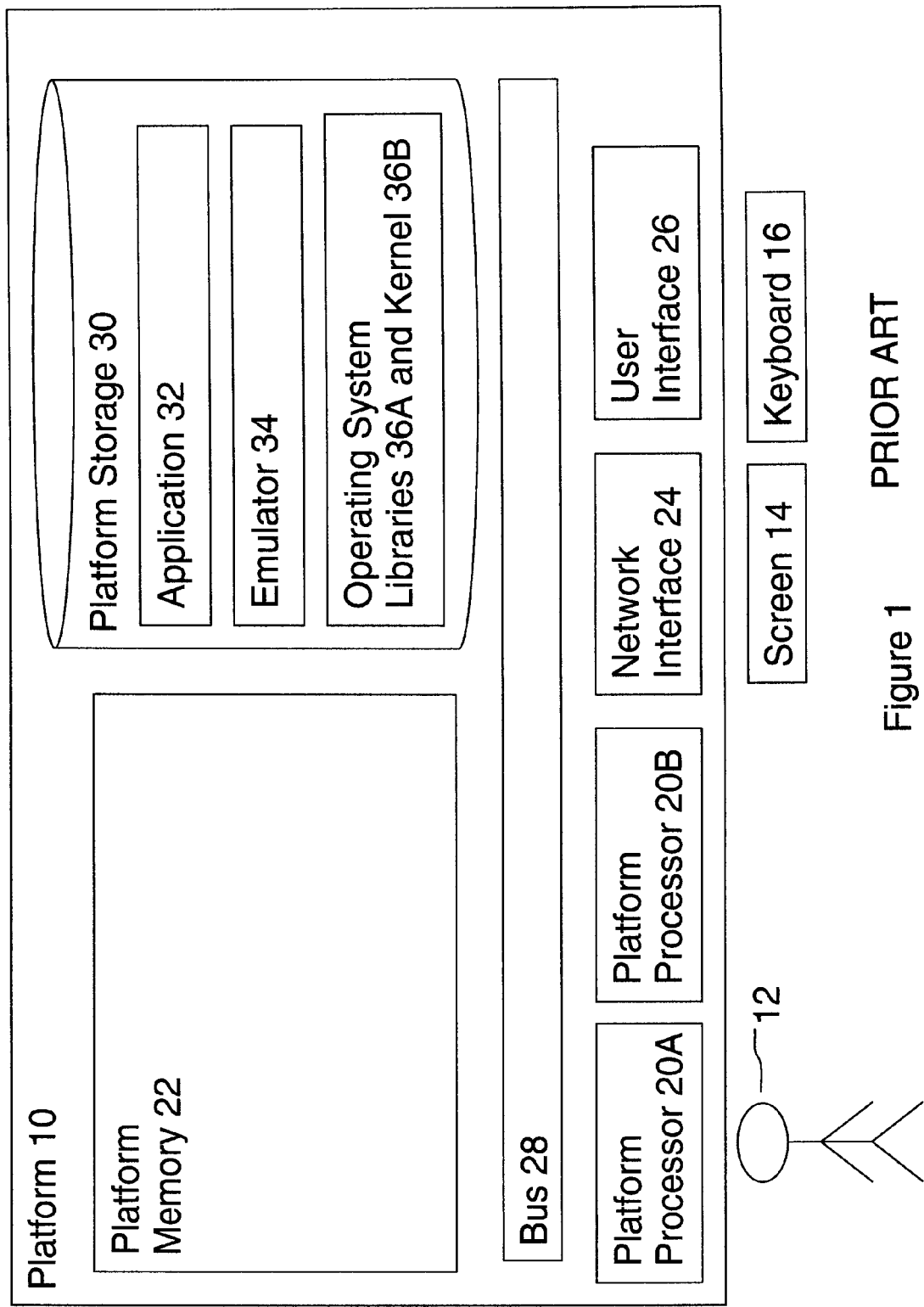
FIG. 1 is a schematic deployment diagram of a standard multi-processor emulator system according to the prior art.

Referring to FIG. 1, there is shown a deployment diagram of a platform 10 for interaction with user 12 using screen 14 and keyboard 16. Platform 10 comprises: platform processors 20A and 20B; platform memory 22; network interface 24; platform user interface 26; bus 28 and platform storage 30. An example of platform 10 is an IBM*POWER*750 Express* server.

Processor 20A and 20B take instructions and data from platform memory 22 for performing logical operations on data according to the instructions. Examples of instructions include add data, subtract data, read data, write data. An example of a processor is an IBM POWER7* processor. *IBM, Express, POWER, POWER7 are trademarks of International Business Machines in the US and/or other countries Platform memory 22, faster than platform storage 30, is designed for fast access so that it does not limit processor speed. In operation processors 20A and 20B access and execute code stored in platform memory 22. An example of the code is application 32. An example of execution memory is 8 GB to 512 GB registered dual in-line memory modules (RDIMM) comprising a series of dynamic random access memory (DRAM) integrated circuits.

Network interface 24 is for communicating with other platforms connected to platform 10 on a network, for example, a local area network (LAN) or the Internet. Typically such communications are service calls when platform 10 will request another network device to provide a service such as performing an operation on supplied data.

Platform user interface 26 is for receiving input from user 12 via keyboard 16, mouse or other human input device. It is also for sending output to user 12 via screen 14, speakers or other human output device.

Bus 28 provides the communication paths for instructions and data between processors 20A and 20B, platform memory 22, network interface 24, platform user interface 26 and platform storage 30.

Storage memory 30 is slower than working memory 22 but is designed to hold much more data. An example of storage memory is an 8 Tb disk drive. When the platform is not operating then platform memory 22 is empty; platform storage 30 stores both execution code for upload to working memory and data for use with the execution code. The execution code for a prior art emulation system comprises; application 32; emulator 34; and operating system libraries 36A and operating system kernel 36B.

Application 32 can be any application that interacts with a user using the standard operating system 34 methods for input and output. In the present embodiment, the multiple processors each execute an instance of application 32.

Figure 3:
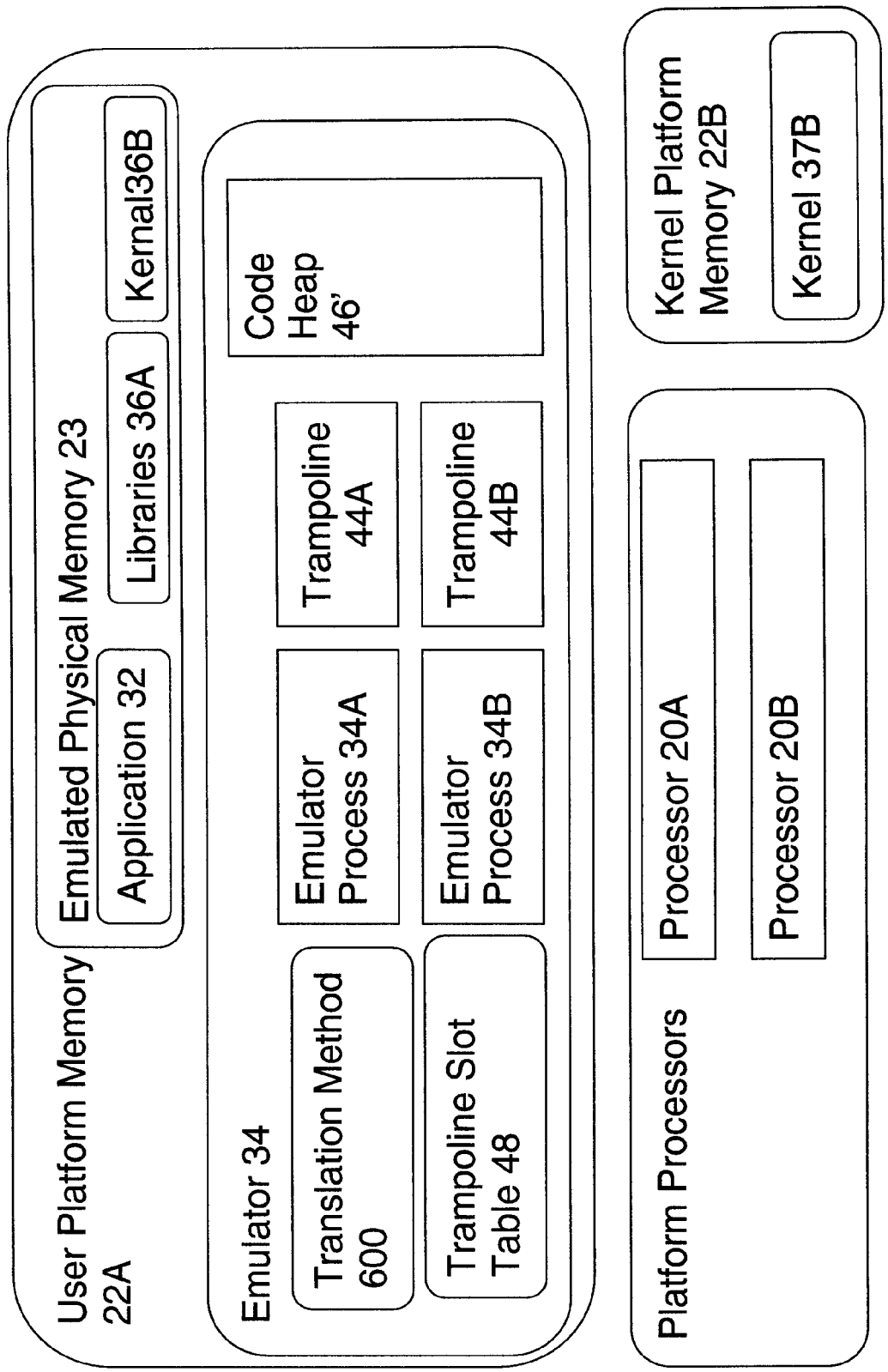
FIG. 3 is a schematic operating system and emulator memory model according to the preferred embodiment.

Emulator 34 is a program that simulates or emulates an entirely different platform (the subject platform) to the application from the underlying platform (the target platform). An example is shown in FIG. 3.

Operating system library 36A is for providing basic platform operating functions such as file storage and input/output functions.

Operating system kernel 36B provides the core set of processor instructions that the operating system library relies on.

Figure 2:
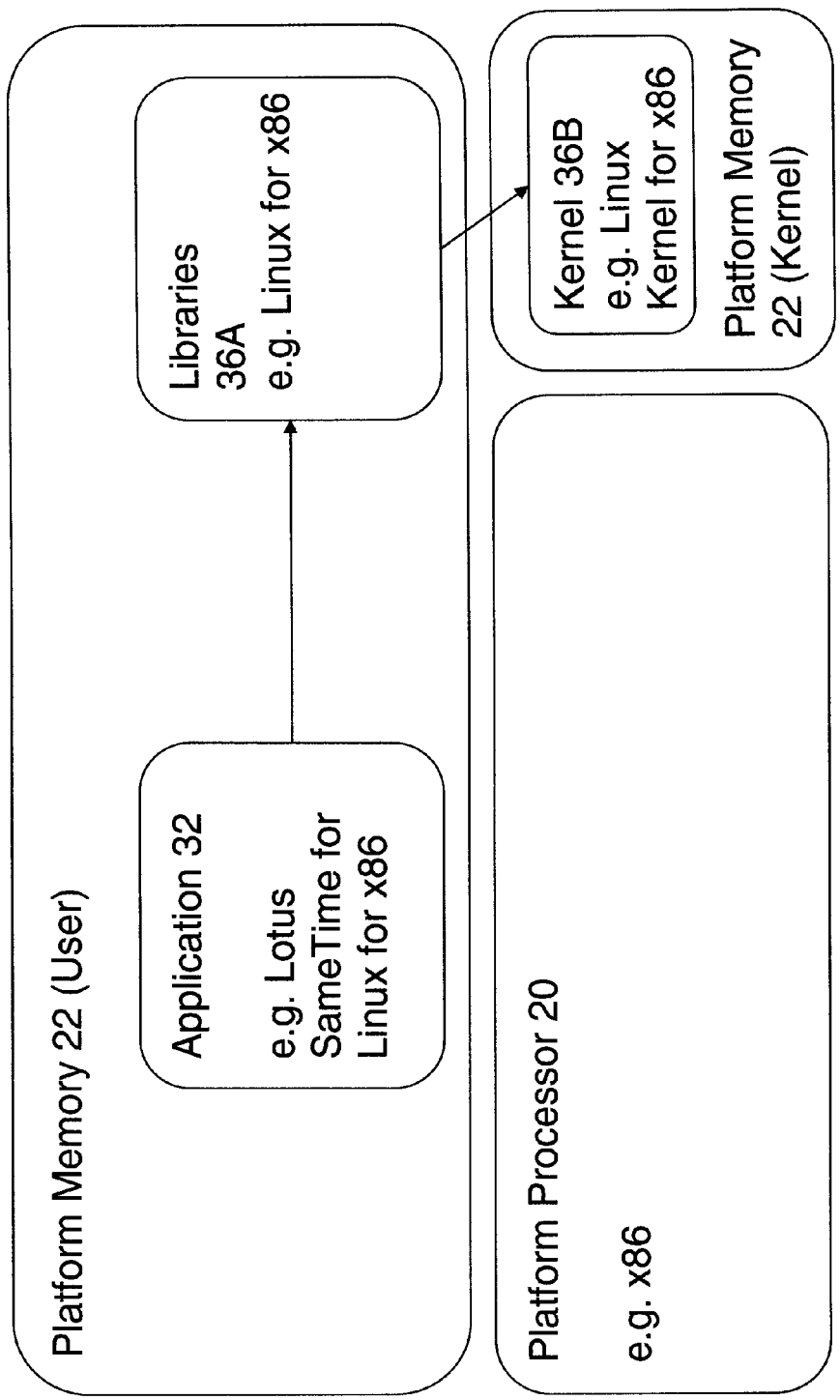
FIG. 2 is a schematic standard operating system platform memory model according to the prior art.

Referring to FIG. 2, a prior art schematic standard operating system platform memory model comprises: platform processor 20; and platform memory 22.

Platform processor 20 is hardware processor with a central processing unit (CPU), for example, an x86 series CPU. Platform memory 22 is split into user platform memory for application 22 and operating system libraries 36A and kernel platform memory for a kernel 36B. The two parts of memory only communicate via an interface between library 36A and kernel 36B. Continuing the example, the application might be an instant messaging application such as IBM® Lotus® Same- Time® for Linux x86 and the operating system libraries could be Linux libraries for running on an x86 CPU and using a Linux Kernel for x86. Linux® is the registered trademark of Linus Torvalds in the U.S. and other countries. IBM, Lotus and SameTime are trademarks of International Business Machines in the US and/or other countries.

Referring to FIG. 3, an operating system and emulator memory model according to the preferred embodiment comprises: platform processors 20A and 20B; user platform memory 22A and kernel platform memory 22B.

Platform memory 22A comprises: emulated physical memory 23; and emulator 34.

Emulated physical memory 23 comprises: application 32; libraries 36A; and kernel 36B.

Emulator 34 comprises: translation method 600; emulator processes 34A and 34B; corresponding private trampoline regions 44A and 44B for each emulator process; code heap 46' (code heap 46 represent a prior art code heap in FIG. 11) and trampoline slot table 48. In the preferred embodiment any number of emulator processes can be embodied limited only by the number of processors on the platform; therefore, two emulated processes is only an example and not limiting.

Figure 4:
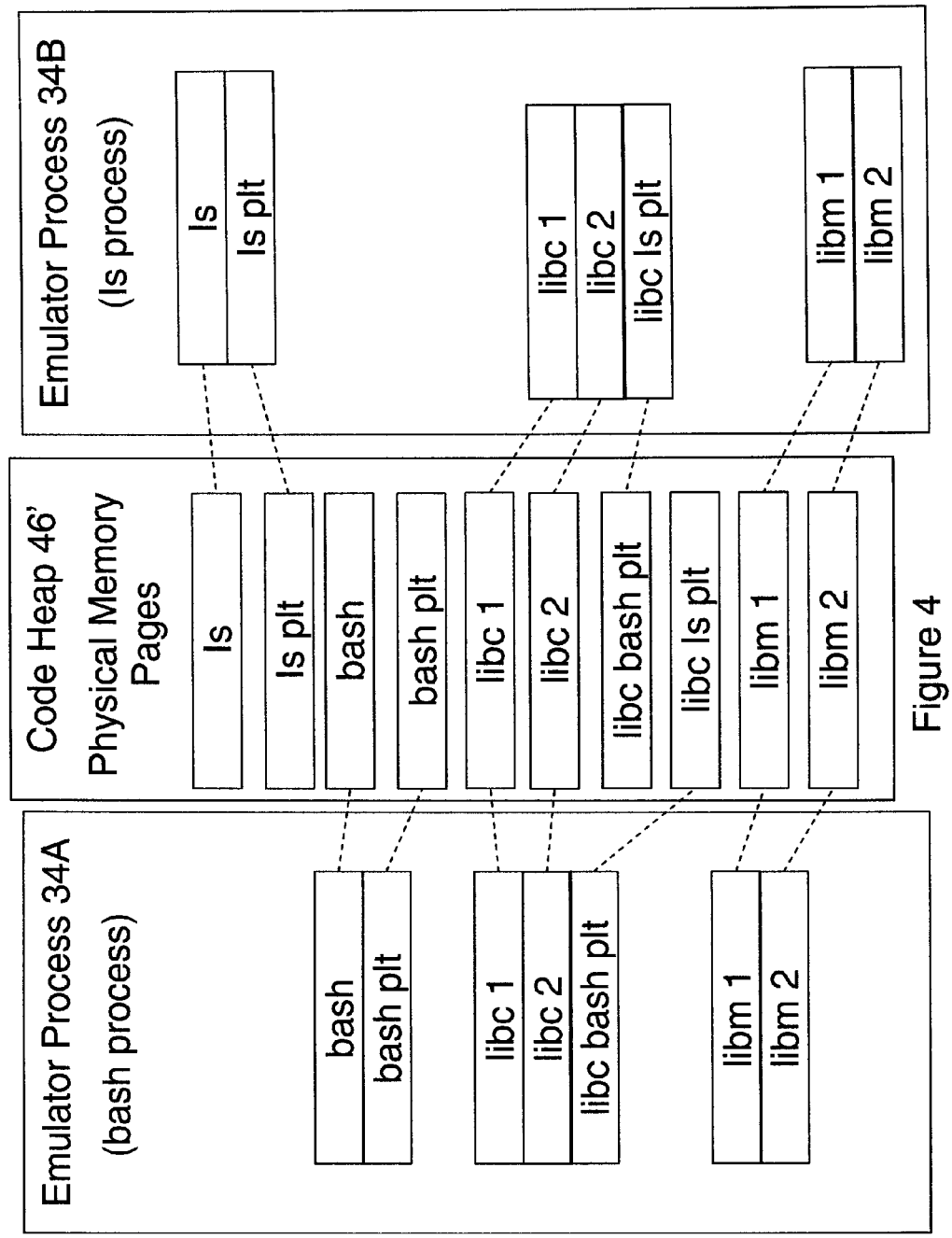
FIG. 4 is a schematic representation of emulated memory pages and an example mapping onto two different emulated processes according to preferred embodiment.

Referring to FIG. 4, physical memory pages comprises the physical memory pages of the code heap 46' after target code is stored there. The memory pages store any number of libraries and the displayed list is only an example comprising the names of certain methods. To the left and right of the physical memory pages are respective current virtual memory maps for two emulator processes: bash process (e.g. emulator process 34A) and is process (e.g. emulator 34B). Each process is an ordered set of libraries contained within the physical memory pages. The preferred embodiment discloses how to maintain each process using respective trampoline memory areas. The preferred embodiment uses the trampoline area to link together not only libraries but also fragments of code within libraries as is shown in more detail in FIG. 5. Each time a processor runs a new process it switches memory context, the virtual memory map is deleted and updated; at this point the when the slots in the corresponding trampoline region are reset to traps.

Figure 5:
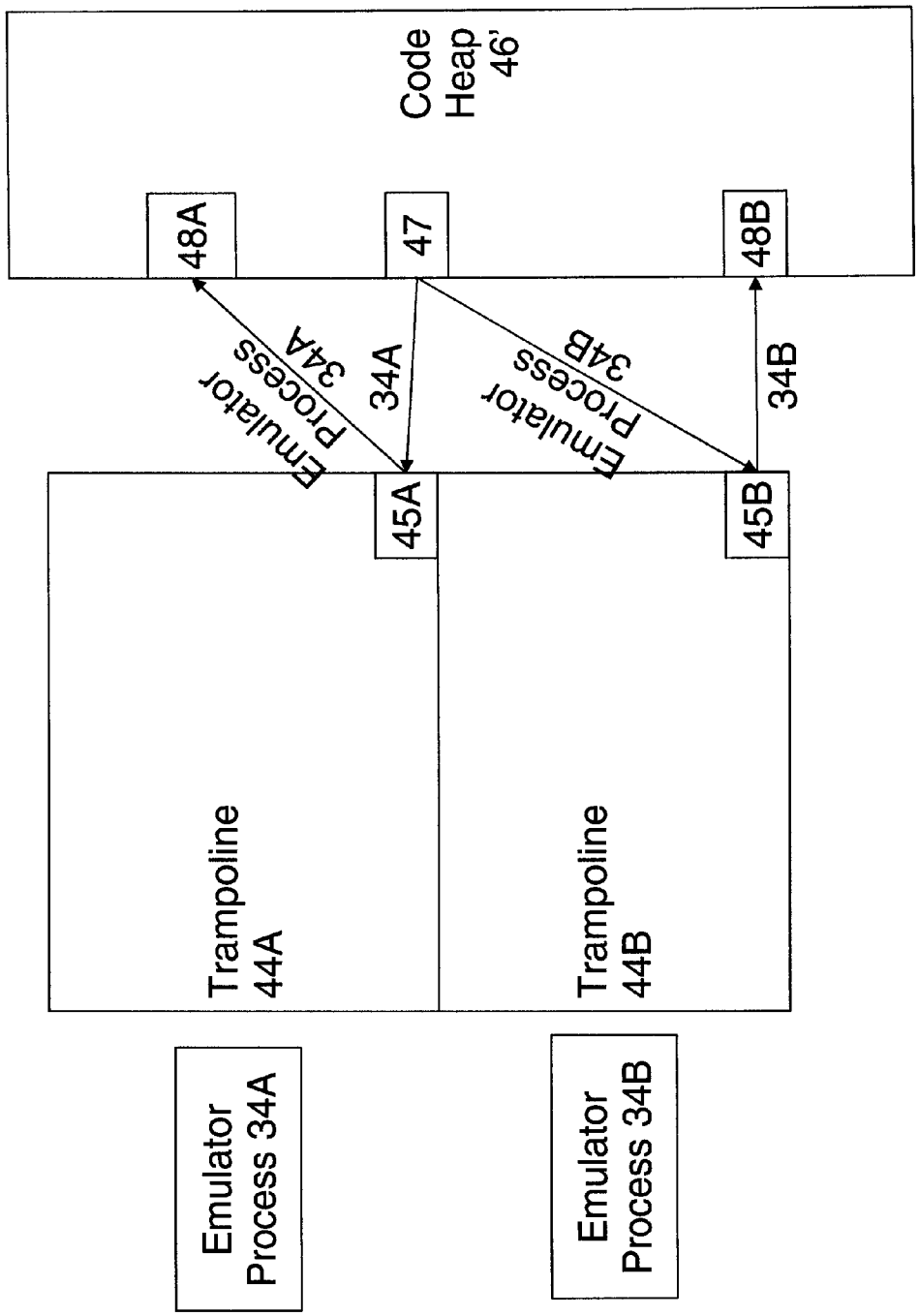
FIG. 5 is a schematic representation of an example jump from a instruction in emulated physical memory pages.

Referring to FIG. 5, a schematic representation of an example jump from an instruction fragment in emulated physical memory pages is shown. Code heap 46' contains three code fragments 47, 48A and 48B. Execution of fragment 47 will result in a final jump to the next fragment. In the preferred embodiment the jump will depend on which emulated process is executing fragment 47 and in the example of FIG. 5 emulator process 34A will jump to location 45A in trampoline region 44a. Similarly emulator process 34B will jump to location 45B in trampoline region 44B. Location 45A and 45B are associated with the same particular slot and offset into each trampoline region represented by the location of 45A and 45B being in the bottom right corner of the trampoline boxes in FIG. 5. When emulator process 34A is executed and location 45A is reached then: the next instruction fragment 48A is determined; a jump written to slot 45A; and the jump made by the processing control. All future emulator process 34As jumping from fragment 47 will jump via 45a to 48A without having to determine the actual next instruction.

Similarly, when emulator process 34B is executed and location 45B is reached then: the next instruction fragment 48B is determined; a jump written to slot 45B; and the jump made by the processing control. All future emulating emulator process 34Bs jumping from fragment 47 will jump via 45B to 48B without having to determine the actual next instruction.

Preferably, a jump is directed to the trampoline region by jumping to a fixed virtual address, and configuring the virtual address spaces of the emulator processes such that the range of virtual memory used to access the trampoline region maps to the appropriate local trampoline region in physical memory.

Figure 6:
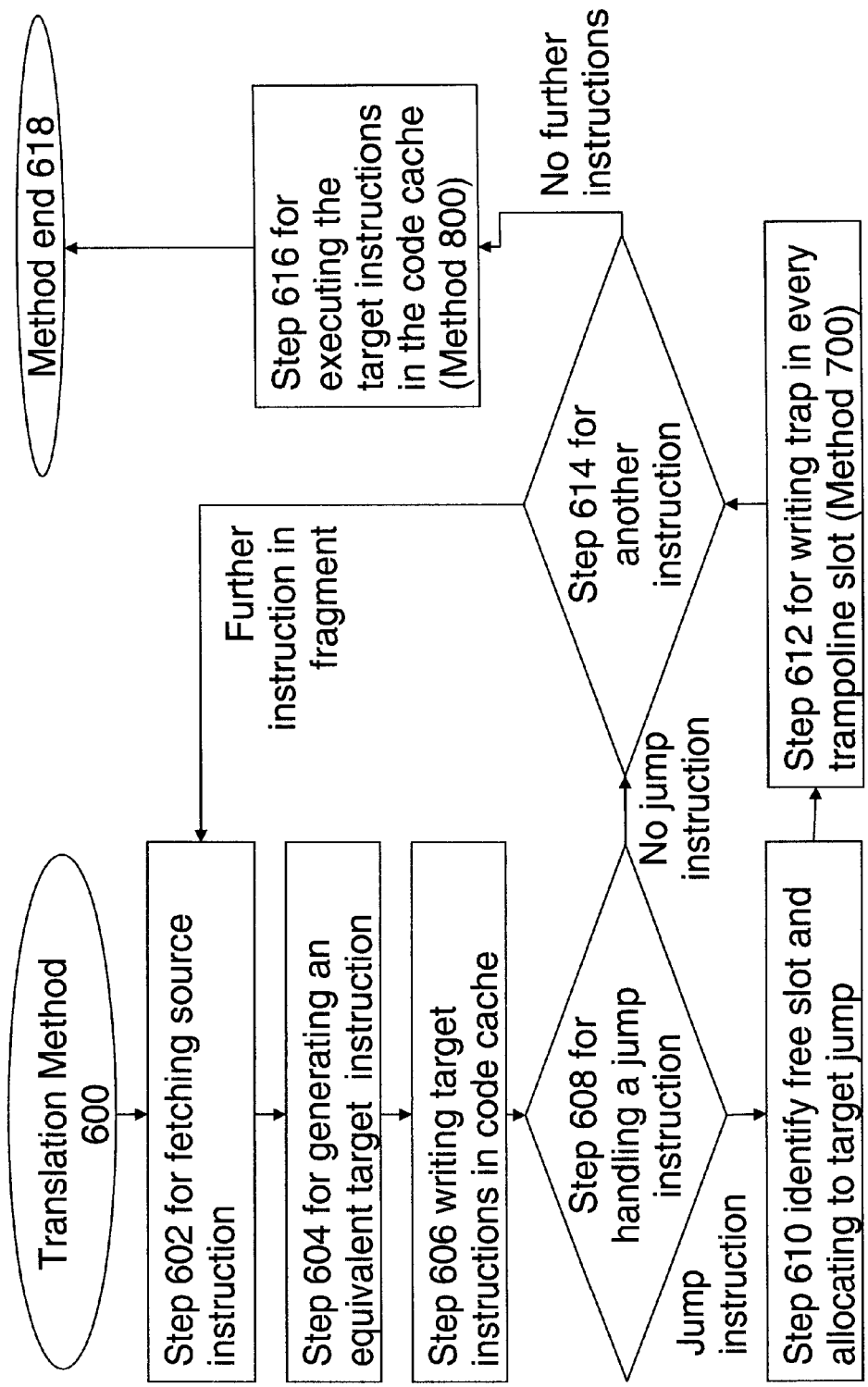
FIG. 6 is a schematic method diagram of a translation method according to the preferred embodiment.

Referring to FIG. 6, translation method 600 is described according to the preferred embodiment. Translation method 600 starts with logical process step 602, ends with step 618, and, in the preferred embodiment, includes calls to logical methods 700, 800, 900 and 1000.

Step 602 is for fetching the source instruction from a source fragment in the application that would expect to be executed on the emulating processor. Step 602 starts with first instruction method 600 loops back to step 602 for subsequent instruction including the last instruction. Translation method 600 quits the loop back to step 602 when there is no further instruction in the fragment. After step 602 is step 604.

Step 604 is for generating an equivalent target instruction for executing on the platform processor. Next is step 606.

Step 606 is for writing the generated equivalent target instruction to the code heap. Next is step 608.

Step 608 jumps to step 610 if the target instruction is a jump instruction. Else, if the instruction is not a jump instruction, then step 614.

Step 610 is for identifying a free slot in a list of trampoline slots and allocating it the origin address of the target instruction. Details of the destination of the jump are thereby associated with slot by checking the original target instruction. Next step 612.

Step 612 is for writing a trap in every physical trampoline region that has a corresponding emulator process. In the preferred embodiment step 612 calls method 700 described with reference to FIG. 7 below. For conditional jumps there may be another instruction in the fragment and next is step 614. If the jump is unconditional then this would signal the end of the fragment.

Step 614 loops back to step 602 if there is another source instruction in the application fragment. An unconditional jump signals the end of a fragment. Else, if there no further instructions, control passed to step 616.

Step 616 is for executing target instructions in the code. In the preferred embodiment step 616 calls method 800 described with reference to FIG. 8 below. Next is step 618.

Method end 618 signals the end of translation method 600.

Figure 7:
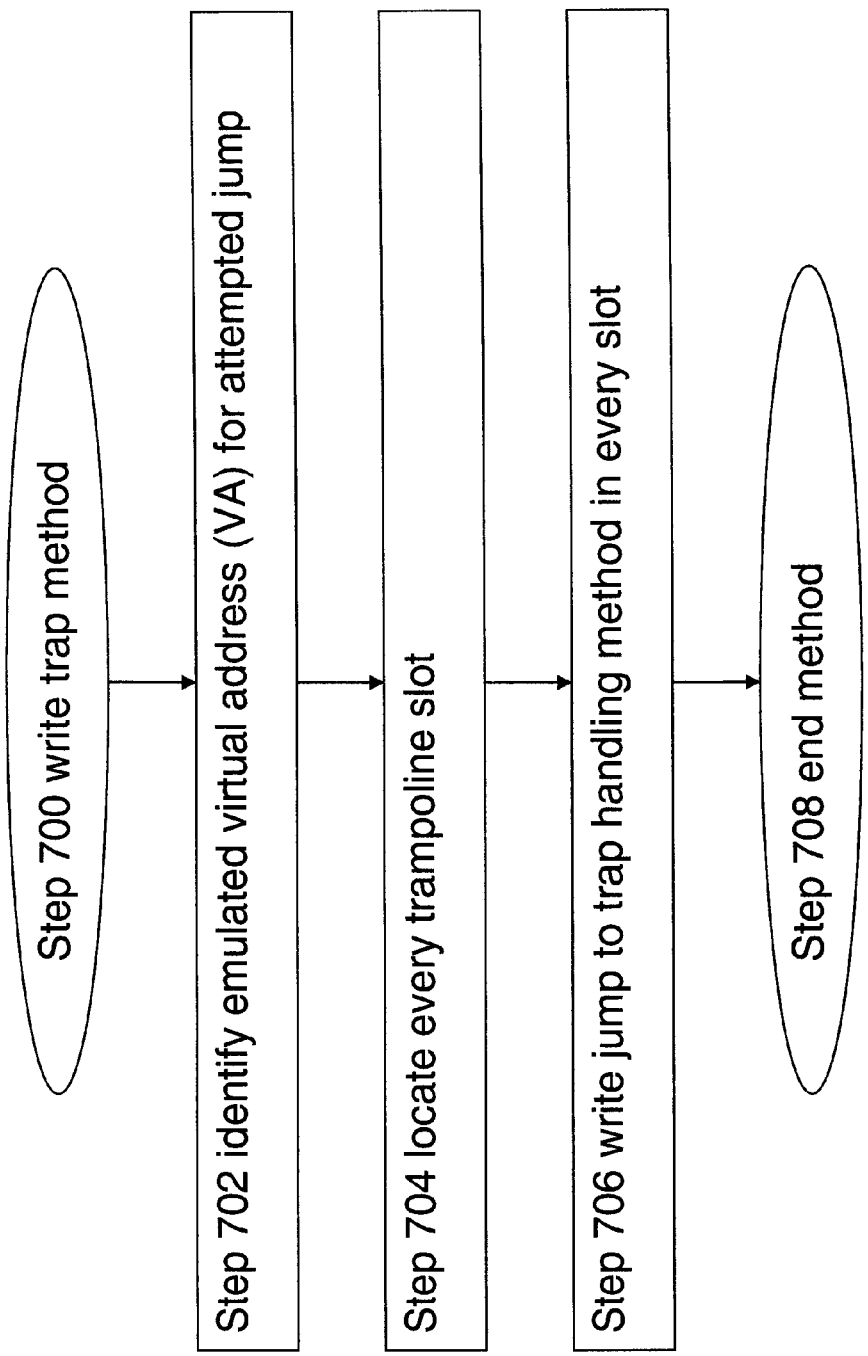
FIG. 7 is a schematic method diagram of a write trap method according to the preferred embodiment.

Referring to FIG. 7, write trap method 700 according to the preferred embodiment comprises logical process steps 702, 704, 706 and 708.

Step 702 is for identifying the emulated virtual address (VA) of the destination fragment for the attempted jump. Next step 704.

Step 704 is for locating every trampoline region containing an allocated slot. Next is step 706.

Step 706 is for writing a jump instruction to the trap handling method in every located trampoline slot. Optionally the emulated virtual address (VA) is written in the slot as part of the jump to trap handling method so that the trap handling method is supplied with the VA and does not need to perform a separate look up. Next step 708.

Step 708 signals the end of method 700.

Figure 8:
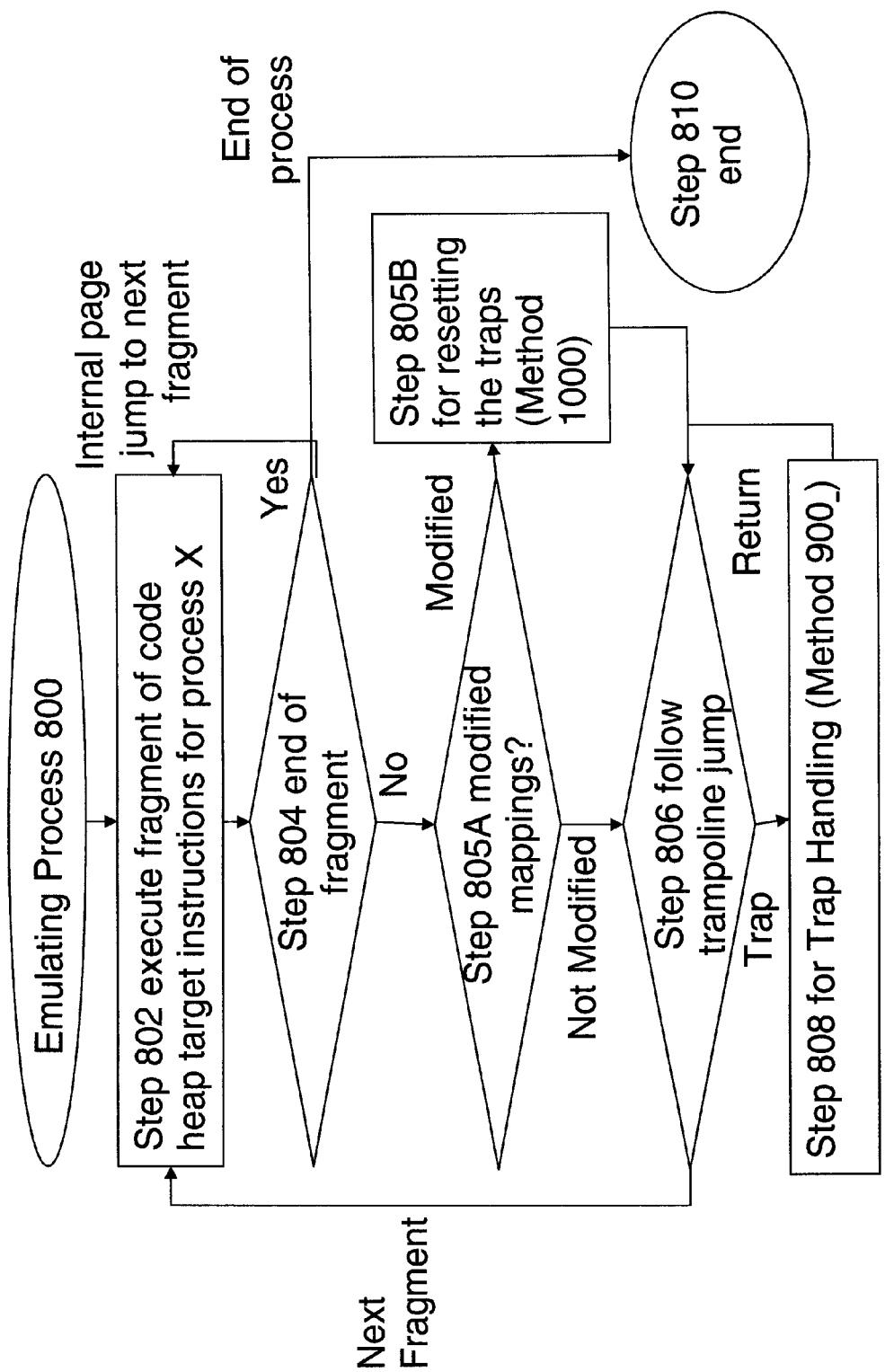
FIG. 8 is a schematic process diagram of an emulating process executing a fragment of code according to the preferred embodiment.

Referring to FIG. 8, emulating process 800 is for executing a fragment of code comprises logical process steps 802 to 810. Method 800 starts with step 802, ends with step 810 and calls method 900 in the preferred embodiment.

Step 802 is for executing a fragment of target instructions in the code heap for an emulating process X. The target instructions are handled by a platform processor. Next step 804.

Step 804 is for looping back to step 802 if the end of the fragment is an internal page jump to the next fragment or for ending the method at step 810 if there are no more fragments. Else, if there is jump to another fragment at a non-statically determinable address, then jumping to trampoline slot associated with the jump at step 805.

Step 805A is for checking if the target instructions modified the page mappings. If the page mappings are modified then step 805B. If the page mappings are not modified then step 806.

Step 805B is for resetting the traps. In the preferred embodiment method 1000 is called and then control is passed to step 806 on the return.

Step 806 is for jumping to the next fragment when the trampoline slot contains a direct jump to the next fragment. Else, the trampoline slot contains a jump to step 808 and control is passed thereto.

Step 808 is for handling traps rewrites the address of the next fragment into the trampoline slot and then returns control to step 806. In the preferred embodiment, step 808 calls method 900 described below with reference to FIG. 9.

Step 810 signals the end of the process.

Figure 9:
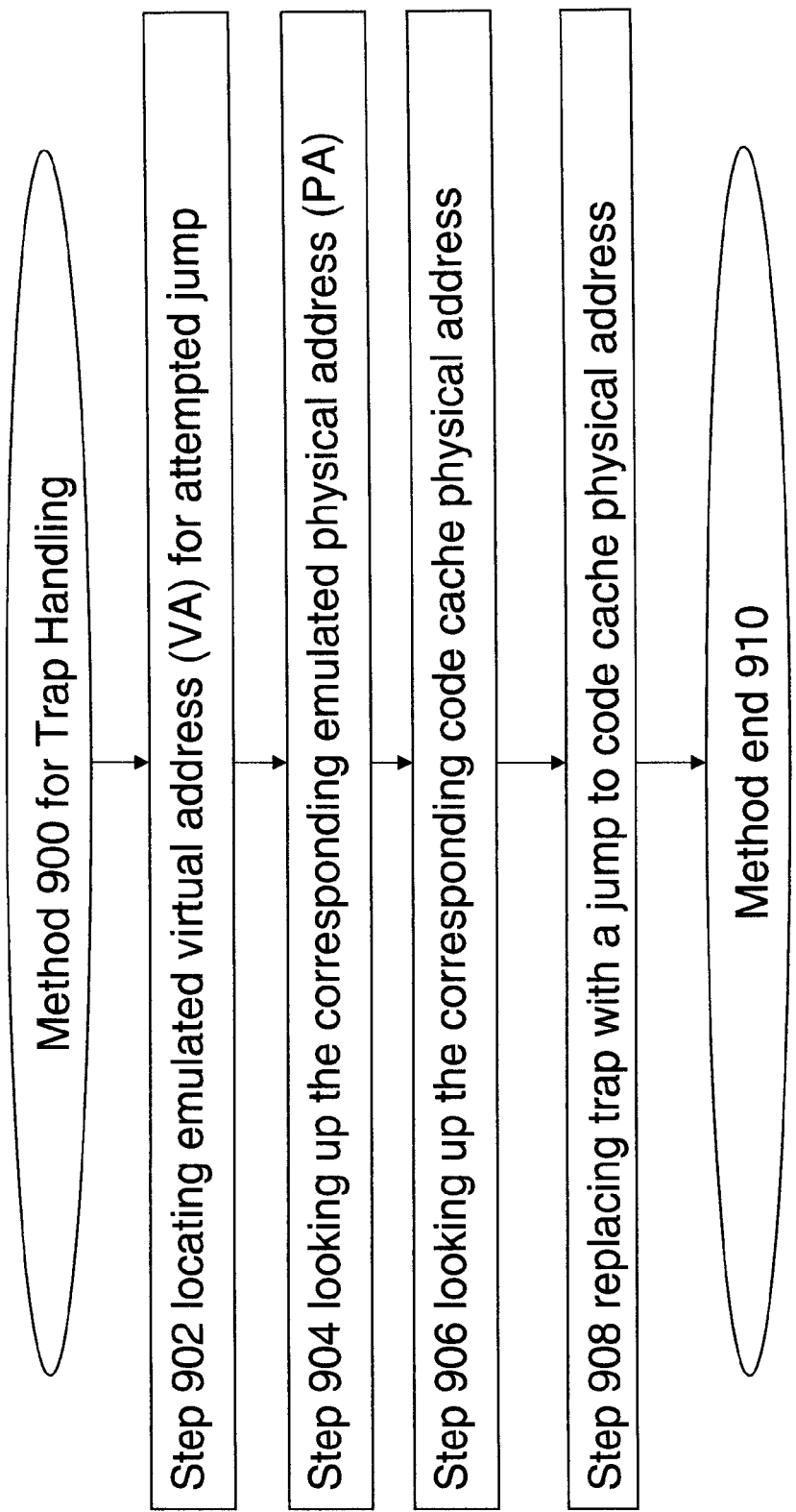
FIG. 9 is a schematic method diagram of a trap handling method according to the preferred embodiment.

Referring to FIG. 9, method 900 for trap handling comprises steps 902 to 910, starts with step 902 and ending with step 910.

Step 902 is for locating an emulated virtual address (VA) for attempted jump. Next is step 904.

Step 904 is for looking up the corresponding emulated physical address (PA). Next is step 906.

Step 906 is for looking up the corresponding code cache physical address. Next is step 908.

Step 908 is for replacing a trap in the respective trampoline slot with a jump to code cache physical address. Next is step 910.

Step 910 signals the end of method 900.

Figure 10:
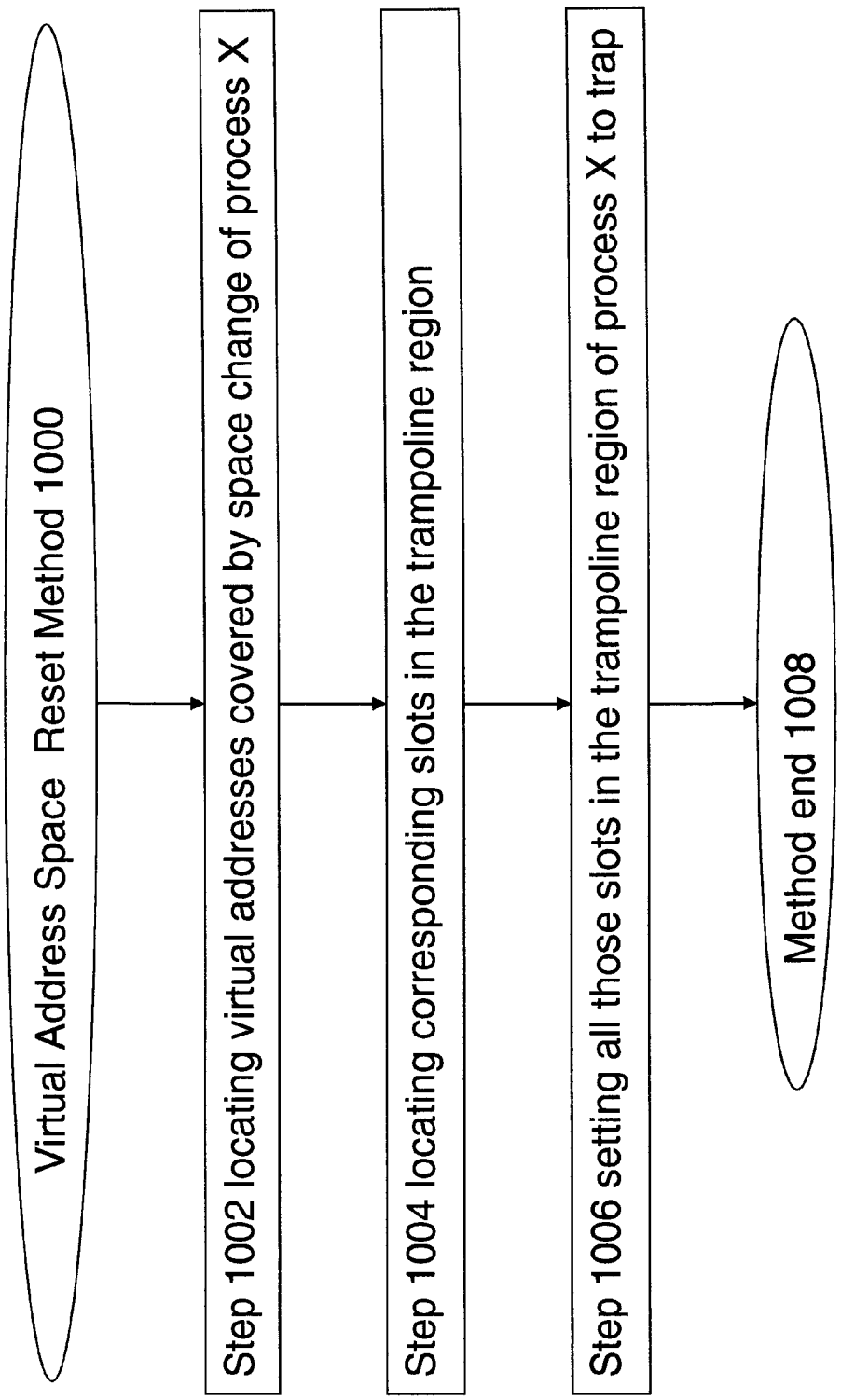
FIG. 10 is a schematic method diagram of a virtual address space reset method according to the preferred embodiment.

Referring to FIG. 10, method 1000 for resetting trampoline slots comprises logical process steps 1002 to 1008. Method 1000 starts with step 1002 and ends with step 1008.

Step 1002 is for locating virtual addresses covered by space change of an emulating process. Next is step 1004.

Step 1004 is for locating corresponding slots in the local trampoline region. Next is step 1006.

Step 1006 is for rewriting all the located slots in the local trampoline region back to traps for method 900 trap handling. Next is step 1008.

Step 1008 is signals the end of the method.

Figure 11:
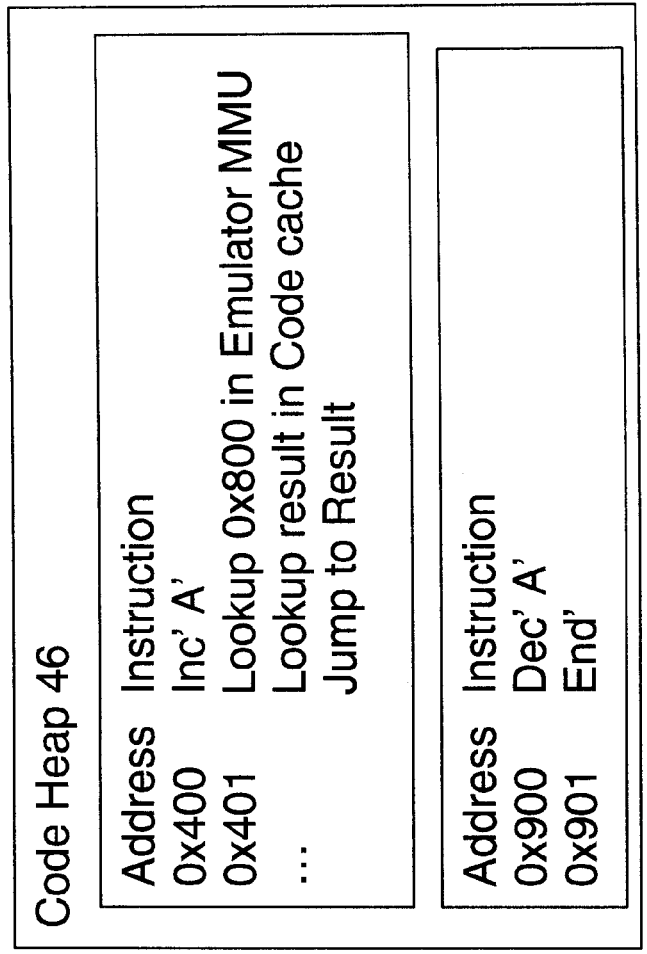
FIG. 11 is an example of the prior art application and code heap.

An example prior art application 32 and code heap 46 is described with reference to FIG. 11.

Prior art application 32 comprises two code fragments in user memory address 0x700 and 0x800. The first fragment at 0x700 increments register A and jumps to the second fragment at 0x800 which decrements register A and ends the applications. The first fragment is translated by a prior art emulation as a fragment at 0x400 in the emulated memory code heap comprising: a translated increment instruction; an emulator address lookup; a code cache address lookup and a jump to the lookup result. The first lookup looks up the virtual address of the second fragment physical address 0x800 in the emulated memory management unit. The second lookup looks up the physical address in the code cache. Prior art emulator would execute the two lookups and jump every time the 0x400 fragment was executed.

An example of an application 32 and code heap 46' of the present embodiment is described with reference to different states of emulator memory as shown in FIG. 12A to 12E.

Figure 12A:
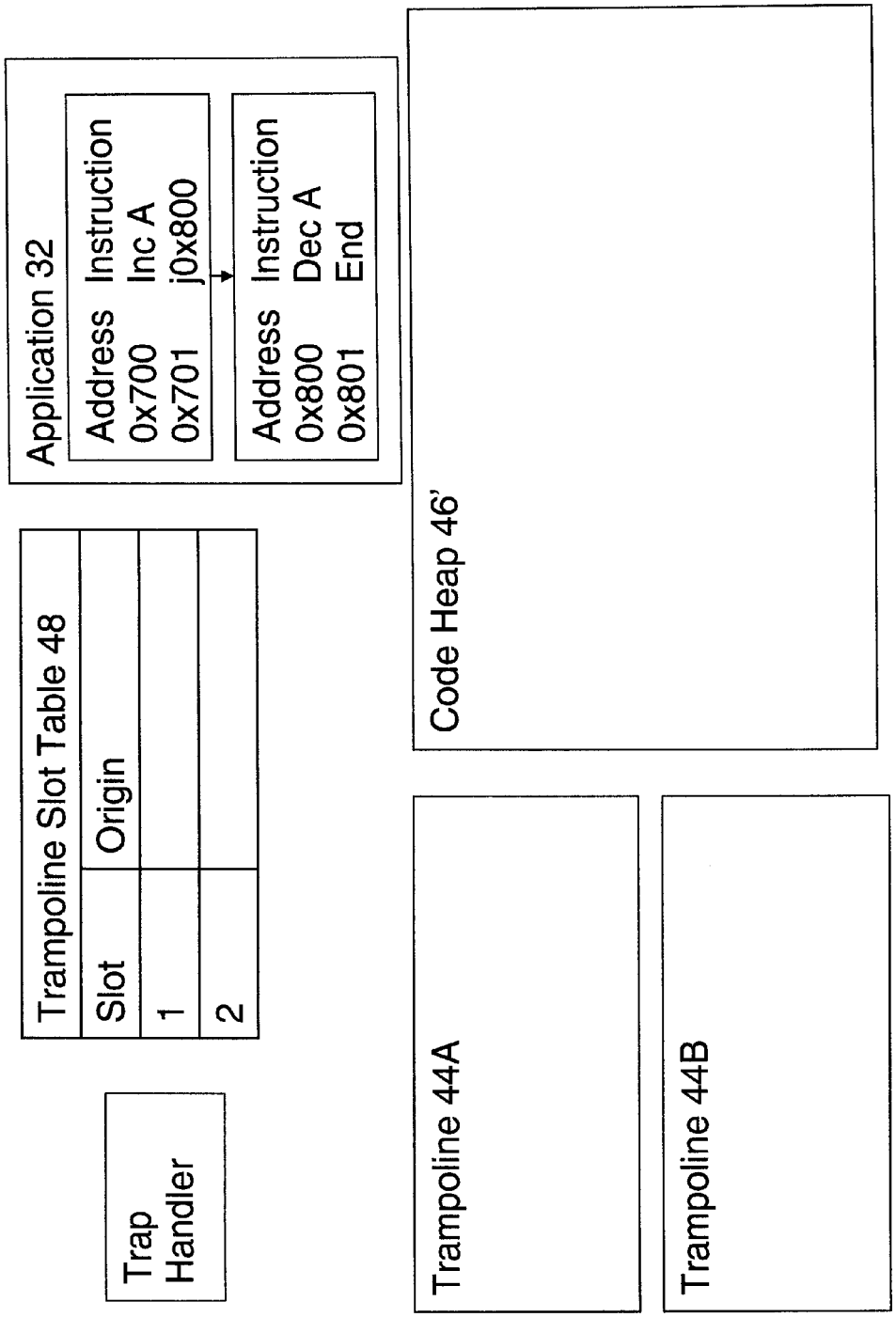
FIGS. 12A to 12E show an example of an application and code of the present embodiment as it changes state.

FIG. 12A shows an first state of the example comprising emulator memory with empty trampoline regions 44A and 44B and empty code heap 46'. Application 32, same application in the prior art example and in all states of this example, comprises two fragments in user memory at address 0x700 and 0x800.

Trampoline slot table 48 comprises a table with two columns: slot and origin. It is empty in FIG. 12A.

Figure 12B:
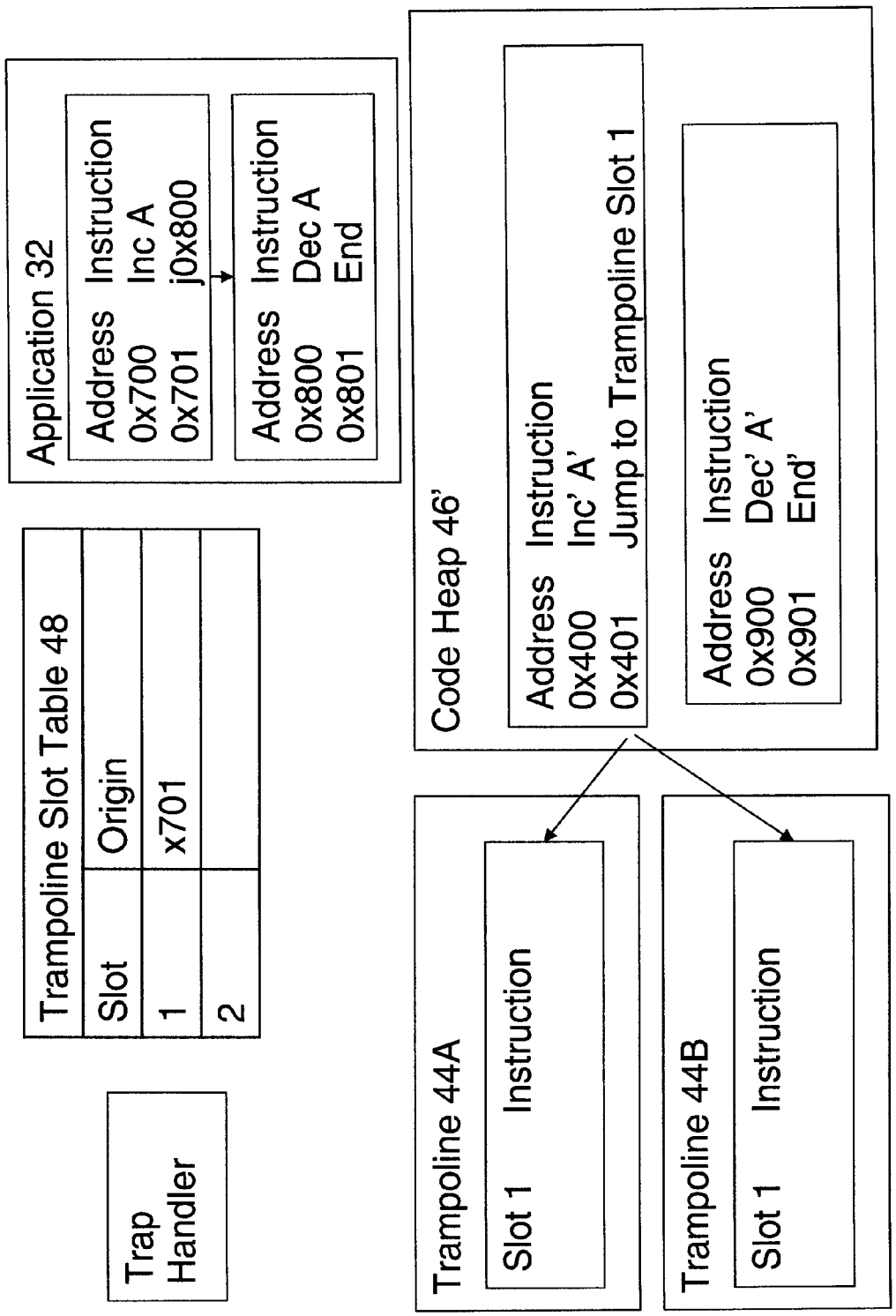

FIG. 12B shows a second state of the example after the translation methods in which the application fragments have been translated and placed into code heap 46'. The first fragment at address 0x400 comprises a translated increment instruction (inc' A') and a jump to generic trampoline slot indexed by the address of source instruction 0x701. The second fragment at code heap address 0x900 comprises a translated decrement instruction and the end of the method.

The trampoline slot table in FIG. 12B-12E is shown with a single slot having been allocated to the jump a 0x701 in the application. The subject physical address of the control flow instruction allows the trap handling routine to examine the instruction at this address and thus determine how to calculate the subject virtual address to which control flow should be directed. Examples are absolute jumps where the address is in the instruction, jumps to registers (e.g. RET instructions) and jumps relative to the current virtual address.

Figure 12C:
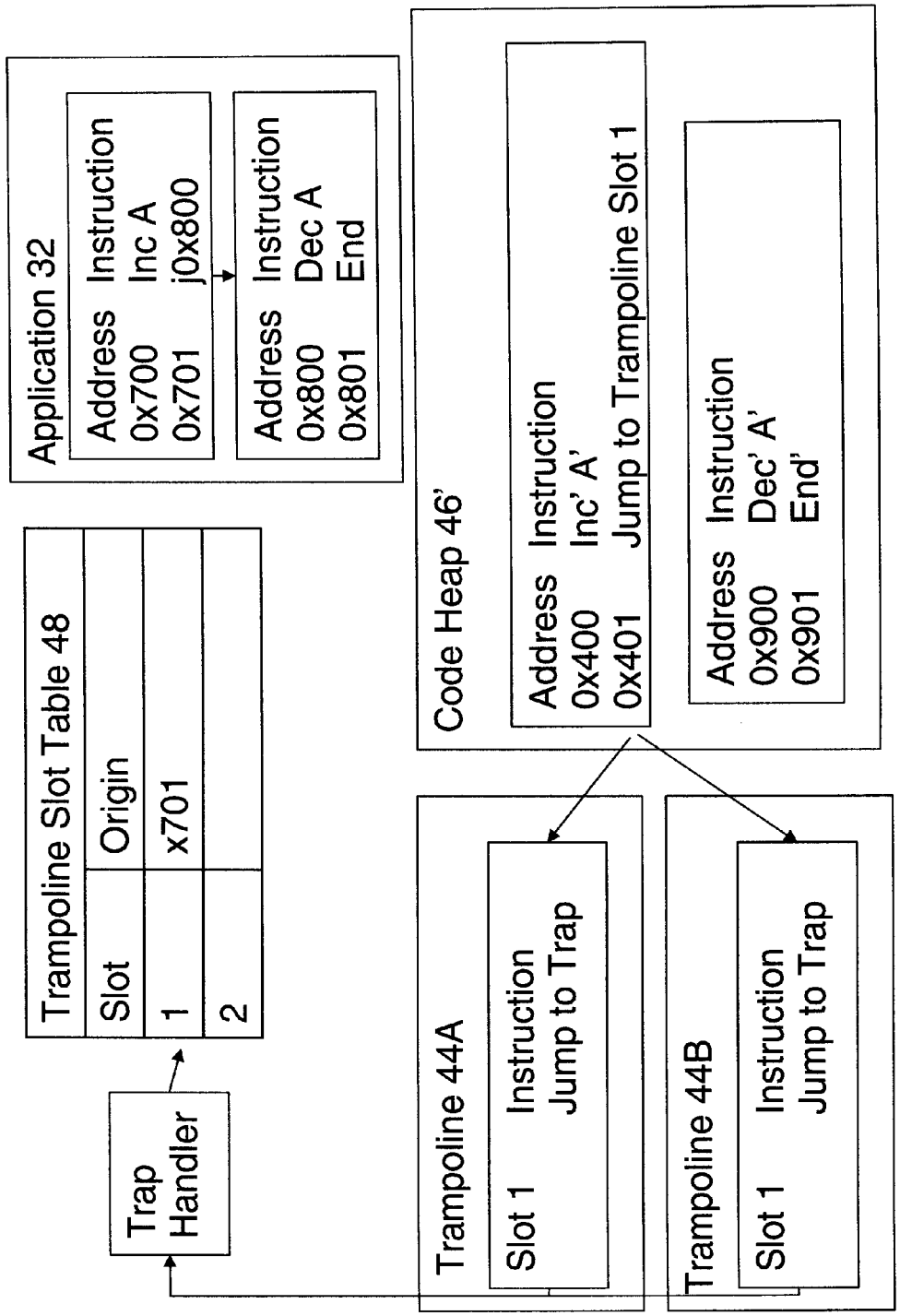

FIG. 12C shows a third state of the example after the trampoline slots have had traps written to slots. Arrows from the code heap to the trampoline region show which emulating process will go to which slot.

Figure 12D:
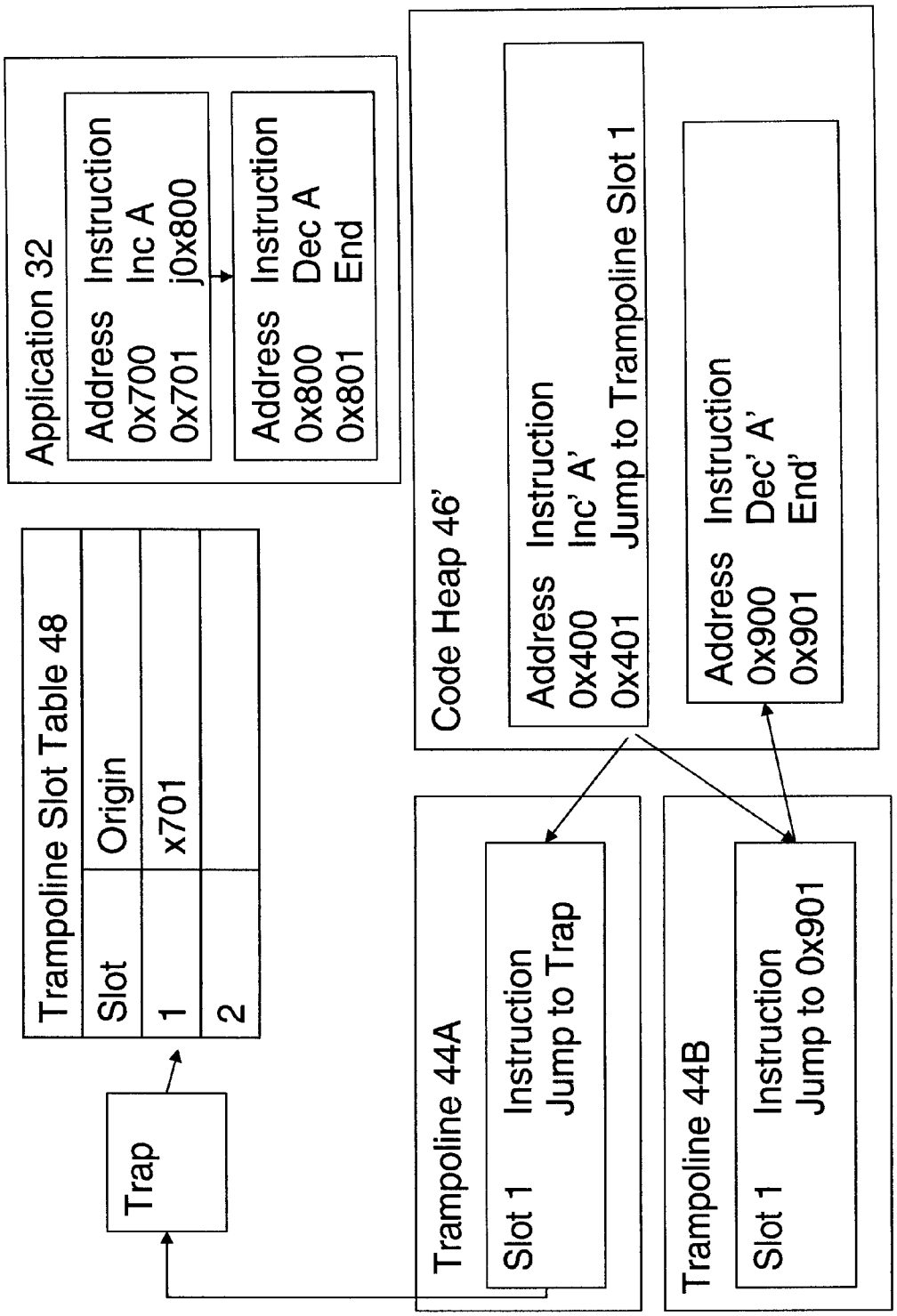

FIG. 12D shows a fourth state of the example after an emulating process 34B has attempted to execute the code at emulated virtual address 0x700. When emulator process 34B arrived at a trapped trampoline slot in trampoline 44B it needed to acquire the address of the second fragment and write it to trampoline 44B before continuing to execute the second fragment.

This is shown in FIG. 12D by the Jump to 0x900 instruction pointing to the second fragment at code heap address 0x900.

Figure 12E:
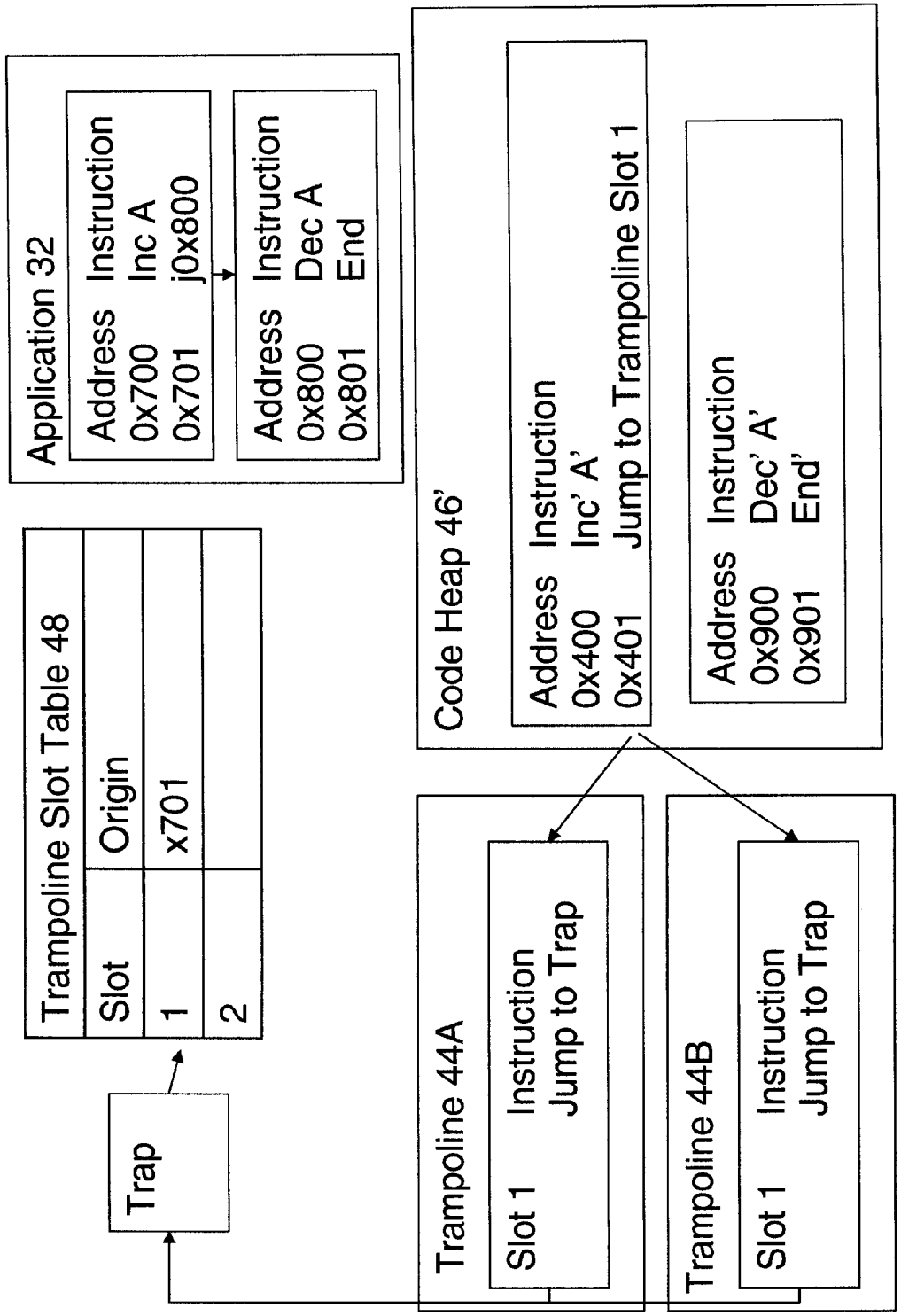

FIG. 12E shows a fifth state of the example after process B changes its address space and where after trampoline slot 0x800 in trampoline 44B is reset to a trap.

Further embodiments of the invention are now described.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause the computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

The invention claimed is:

1. A method for emulating two or more processes for executing a source application, said method for executing on a multi-processor platform and comprising steps of:
   executing a plurality of emulator processes in an emulator on said multi-processor platform;
   providing virtual trampoline memory such that each emulator process has a respective private trampoline memory;
   providing shared code heap memory, wherein each emulator process only sees the code heap and its respective private trampoline memory;
   fetching a fragment of source instructions from emulated physical memory, said emulated physical memory being memory which is emulated by said emulator to act as physical memory to processes being emulated by said emulator;
   generating equivalent target instructions for writing to the shared code heap, the location in the shared code heap of the fragment of target instructions being indexed by its corresponding emulated physical address;
   generating, for at least one jump instruction in the fragment, a respective jump to a corresponding slot in the virtual trampoline memory and replacing the jump in the fragment of target instructions with the respective jump to the corresponding slot in the virtual trampoline memory; and
   for each jump in the fragment of target instructions which was replaced with a respective jump to the corresponding slot in the virtual trampoline memory, writing a respective trap in each private trampoline slot corresponding to the corresponding slot in the virtual trampoline memory, each trap adapted to be replaced by a respective jump to a respective physical address in the shared code heap corresponding to a destination of the corresponding jump in the fragment of target instructions which was replaced with a jump to the corresponding slot in the virtual trampoline memory.

2. A method according to claim 1 further comprising an emulating process reaching the trap and performing the following steps:
   locating an emulated virtual address for the attempted jump, the emulated virtual address being an address in a virtual memory space of a virtual platform emulated by said emulator;
   looking up the corresponding emulated physical address;
   looking up the corresponding code cache address; and
   replacing the trap with a jump instruction to the code cache physical address.

3. A method according to claim 2 further comprising a step of making the jump to the code cache address.

4. A method according to claim 1 further comprising a step of generating, if the jump instruction in the source instruction is a relative jump in the same memory page, a corresponding target relative jump to the equivalent destination fragment and not a jump to a trampoline slot.

5. A method according to claim 1 wherein the subject physical address of the jump instruction is associated with a corresponding slot in the virtual trampoline memory.

6. A method according to claim 1 wherein a respective emulated virtual address for the attempted jump is written in each trap, each emulated virtual address being an address in a respective virtual memory space of a virtual platform emulated by said emulator.

7. A method according to claim 1 wherein when an emulated process changes its address space then affected slots in affected local trampoline regions are reset back to traps.

8. A method according to claim 1 wherein a jump is directed to the virtual trampoline memory by jumping to a fixed virtual address, and configuring the virtual address spaces of the emulator processes such that the range of virtual memory used to access the virtual trampoline memory maps to a respective local trampoline region in physical memory.

9. A method according to claim 1 wherein a jump is directed to the virtual trampoline memory by jumping to a fixed offset from a specified base register, and configuring the base register for each of the emulator processes such that it points to a respective local trampoline region.

10. A method according to claim 1 wherein each trampoline slot is indexed based on the origin address of the jump.

11. A computer program product comprising non-transitory computer readable recording medium having computer readable code stored thereon for emulating two or more processes for executing a source application, each computer interaction comprising at least one application prompt and user input, said computer readable code which when loaded onto a computer system and executed performs the following steps:

executing a plurality of emulator processes in an emulator on said multi-processor platform;

providing virtual trampoline memory whereby each emulator process has a respective private trampoline memory;

providing shared code heap memory, wherein each emulator process only sees the code heap and its respective private trampoline memory;

fetching a fragment of source instructions from emulated physical memory, said emulated physical memory being memory which is emulated by said emulator to act as physical memory to processes being emulated by said emulator;

generating equivalent target instructions for writing to the shared code heap, the location in the shared code heap of the fragment of target instructions being indexed by its corresponding emulated physical address;

generating, for at least one jump instruction in the fragment, a respective jump to a corresponding slot in the virtual trampoline memory and replacing the jump in the fragment of target instructions with the respective jump to the corresponding slot in the virtual trampoline memory; and for each jump in the fragment of target instructions which was replaced with a respective jump to the corresponding slot in the virtual trampoline memory, writing a respective trap in each private trampoline slot corresponding to the corresponding slot in the virtual trampoline memory, each trap adapted to be replaced by a respective jump to a respective physical address in the shared code heap corresponding to a destination of the corresponding jump in the fragment of target instructions which was replaced with a jump to the corresponding slot in the virtual trampoline memory.

12. The computer program product according to claim 11, wherein said computer readable code when loaded onto a computer system and executed further performs an emulating process reaching the trap and performing the following:

locating an emulated virtual address for the attempted jump, the emulated virtual address being an address in a virtual memory space of a virtual platform emulated by said emulator;

looking up the corresponding emulated physical address;

looking up the corresponding code cache address; and replacing the trap with a jump instruction to the code cache physical address.

13. The computer program product according to claim 11, wherein said computer readable code when loaded onto a computer system and executed further performs generating, if the jump instruction in the source instruction is a relative jump in the same memory page, a corresponding target relative jump to the equivalent destination fragment and not a jump to a trampoline slot.

14. The computer program product according to claim 11, wherein the subject physical address of the jump instruction is associated with a corresponding slot in the virtual trampoline memory.

15. A computer program product according to claim 11, wherein a jump is directed to the virtual trampoline memory by jumping to a fixed offset from a specified base register, and configuring the base register for each of the emulator processes such that it points to a respective local trampoline region.

16. A computer system for emulating two or more processes for executing a source application, comprising:

a plurality of processors which execute instructions;

an emulator executable on said plurality of processors, said emulator including a plurality of emulator processes;

virtual trampoline memory wherein each emulator process has a respective private trampoline memory;

shared code heap memory, wherein each emulator process only sees the code heap and its respective private trampoline memory;

wherein said emulator emulates an emulated physical memory to act as physical memory to processes being emulated by said emulator;

wherein said emulator executes a process of:

fetching a fragment of source instructions from said emulated physical memory;

generating equivalent target instructions for writing to the shared code heap, the location in the shared code heap of the fragment of target instructions being indexed by its corresponding emulated physical address;

generating, for at least one jump instruction in the fragment, a respective jump to a corresponding slot in the virtual trampoline memory and replacing the jump in the fragment of target instructions with the respective jump to the corresponding slot in the virtual trampoline memory; and for each jump in the fragment of target instructions which was replaced with a respective jump to the corresponding slot in the virtual trampoline memory, writing a respective trap in each private trampoline slot corresponding to the corresponding slot in the virtual trampoline memory, each trap adapted to be replaced by a respective jump to a respective physical address in the shared code heap corresponding to a destination of the corresponding jump in the fragment of target instructions which was replaced with a jump to the corresponding slot in the virtual trampoline memory.

17. The computer system according to claim 16, wherein said emulator further performs the following:

locating an emulated virtual address for the attempted jump, the emulated virtual address being an address in a virtual memory space of a virtual platform emulated by said emulator;

looking up the corresponding emulated physical address;

looking up the corresponding code cache address; and replacing the trap with a jump instruction to the code cache physical address.

18. The computer system according to claim 16, wherein said emulator further performs generating, if the jump instruction in the source instruction is a relative jump in the same memory page, a corresponding target relative jump to the equivalent destination fragment and not a jump to a trampoline slot.

19. The computer system according to claim 16, wherein the subject physical address of the jump instruction is associated with a corresponding slot in the virtual trampoline memory.

20. A computer system according to claim 16, wherein a jump is directed to the virtual trampoline memory by jumping to a fixed offset from a specified base register, and configuring the base register for each of the emulator processes such that it points to a respective local trampoline region.

\* \* \* \* \*